(12) United States Patent
Romero

(10) Patent No.: US 12,060,018 B2
(45) Date of Patent: Aug. 13, 2024

(54) POWER DELIVERY ASSEMBLIES

(71) Applicant: Molex, LLC, Lisle, IL (US)

(72) Inventor: Luis Ramses Rubio Romero, Tlajomulco de Zuñiga (MX)

(73) Assignee: Molex, LLC, Lisle, IL (US)

( * ) Notice: Subject to any disclaimer, the term of this patent is extended or adjusted under 35 U.S.C. 154(b) by 24 days.

(21) Appl. No.: 17/776,140

(22) PCT Filed: Dec. 16, 2020

(86) PCT No.: PCT/US2020/065180
§ 371 (c)(1),
(2) Date: May 11, 2022

(87) PCT Pub. No.: WO2021/126890
PCT Pub. Date: Jun. 24, 2021

(65) Prior Publication Data
US 2022/0396224 A1    Dec. 15, 2022

Related U.S. Application Data

(60) Provisional application No. 62/948,345, filed on Dec. 16, 2019.

(51) Int. Cl.
*B60R 16/03* (2006.01)
*H04L 12/40* (2006.01)

(52) U.S. Cl.
CPC .............. *B60R 16/03* (2013.01); *H04L 12/40* (2013.01); *H04L 2012/40273* (2013.01)

(58) Field of Classification Search
CPC .............................. B60R 16/03; H04L 12/40; H04L 2012/40273
See application file for complete search history.

(56) References Cited

U.S. PATENT DOCUMENTS 9,015,775 B2    4/2015    Perlman
2011/0009057 A1    1/2011    Saunamaki
(Continued)

FOREIGN PATENT DOCUMENTS

| JP | 2018011435 A | 1/2018 |
| JP | 2019164716 A | 9/2019 |

(Continued)

OTHER PUBLICATIONS

International Search Report and Written Opinion received for PCT Application No. PCT/US2020/065180, dated Mar. 11, 2021, 09 Pages.
(Continued)

*Primary Examiner* — Jared Fureman
*Assistant Examiner* — Duc M Pham

(57) ABSTRACT

Exemplary embodiments are disclosed of power delivery (PD) assemblies, including powering, charging, and data connect devices usable within vehicles, etc. In exemplary embodiments, a power block (e.g., standalone power block, wireless charger, etc.) may be connected via a vehicle harness to a user interface (PD charger only) or a user interface (USB hub with charging and data). Accordingly, power blocks having the same or common form factor and vehicle harnesses having the same or common configuration (Vbus PD, GND, CC1, and CC2) may therefore be used to interchangeably connect to charger only user interfaces or to user interfaces with charging and data.

20 Claims, 16 Drawing Sheets

(56) References Cited

U.S. PATENT DOCUMENTS

| | | | |
|---|---|---|---|
| 2011/0074954 A1 | 3/2011 | Lin | |
| 2011/0220430 A1 | 9/2011 | Fowler | |
| 2012/0319469 A1* | 12/2012 | Krenz | H02J 3/007 307/9.1 |
| 2018/0019598 A1 | 1/2018 | Tsuchiya et al. | |
| 2018/0126932 A1* | 5/2018 | Secord | H01R 25/003 |
| 2018/0138703 A1* | 5/2018 | Chan | G06F 1/263 |
| 2020/0369189 A1* | 11/2020 | Vite Cadena | B60R 7/04 |

FOREIGN PATENT DOCUMENTS

| | | |
|---|---|---|
| KR | 101204384 B1 | 11/2012 |
| KR | 20130004397 U | 7/2013 |
| TW | 201109201 A | 3/2011 |

OTHER PUBLICATIONS

International Preliminary Report on Patentability received for PCT Application No. PCT/US2020/065180, dated Jun. 30, 2022, 08 Pages.

\* cited by examiner

POWER DELIVERY ASSEMBLIES

RELATED CASES

This application is a national phase of PCT/US2020/065180, filed on Dec. 16, 2020, which claims priority to U.S. Provisional Appln. No. 62/948,345, filed Dec. 16, 2019, all of which are incorporated herein by reference in their entireties.

FIELD

This disclosure generally relates to the field of power delivery (PD), and more specifically (but not exclusively) to powering, charging, and data connect devices.

BACKGROUND

This section provides background information related to the present disclosure which is not necessarily prior art.

Vehicles may be equipped with USB panel mount hubs (FIG. 1), USB embedded hubs (FIG. 2), USB panel mount chargers (FIG. 3), or USB embedded chargers (FIG. 4). For example, FIG. 1 illustrates a conventional USB panel mount hub 101 and vehicle harness including a USB cable 109 (Vbus, Data+, Data−, Ground (GND)) that extends between a dual port USB user interface 113 and panel display 117.

FIG. 2 illustrates a conventional USB embedded hub 201 and vehicle harness including a USB cable 209 (Vbus, Data+, Data−, Ground (GND)) that extends between a dual port USB user interface 213 and panel display 217. Additional power/USB cables 221 (Vbus PD, Data+, Data−, GND, CC1, CC2) are connected with the dual port USB user interface 213.

FIG. 3 illustrates a conventional USB panel mount charger 301 and vehicle harness including a battery cable 325 connected with a dual port USB user interface 313. FIG. 4 illustrates a conventional USB embedded charger 401 and vehicle harness including a battery cable 425 and additional power/USB cables 421 (Vbus PD, Data+, Data−, GND, CC1, CC2) connected with a dual port USB user interface. FIG. 5 is a block diagram showing various components 503 that may be used with the USB embedded hub 201 shown in FIG. 2.

As recognized herein, the conventional USB panel mount hub 101 (FIG. 1) may provide a cost-effective solution because it does not include the high cost power/USB cables 221 (Vbus PD, Data+, Data−, GND, CC1, CC2) shown in FIG. 2. But the conventional USB panel mount hub 101 is limited in terms of its module size and power dissipation due to the maximum surface temperature allowed on the panel that the end user will contact, such that overheating and heat removal issues are important considerations. Also, the conventional USB panel mount hub 101 is constrained by the panel opening and surrounding electronic components, such that resolving electrostatic discharge (ESD) issues is also an important design considerations.

By comparison to the conventional USB panel mount hub 101, the conventional USB embedded hub 201 (FIG. 2) is more costly due to the high cost additional power/USB cables 221 (Vbus PD, Data+, Data−, GND, CC1, CC2). Also, the conventional USB embedded hub 221 is constrained by cable length and signal integrity, which are important design considerations.

The conventional USB panel mount charger 301 (FIG. 3) may provide a cost-effective solution because it does not include the high cost power/USB cables 421 (Vbus PD, Data+, Data−, GND, CC1, CC2) shown in FIG. 4. But the conventional USB panel mount charger 301 is limited in terms of its module size and power dissipation due to the maximum surface temperature allowed on the panel that the end user will contact, such that overheating and heat removal issues are important considerations. Also, the conventional USB panel mount charger 301 is constrained by the panel opening and surrounding electronic components, such that resolving electrostatic discharge (ESD) issues is also an important design considerations.

By comparison to the conventional USB panel mount charger 301, the conventional USB embedded charger 401 (FIG. 4) is more costly due to the high cost additional power/USB cables 421 (Vbus PD, Data+, Data−, GND, CC1, CC2).

Given the above limitations and drawbacks associated with the conventional USB panel mount hubs 101 (FIG. 1), USB embedded hub 201 (FIG. 2), USB panel mount charger 301 (FIG. 3), and USB embedded charger 401 (FIG. 4), certain individuals would appreciate improvements in such power deliver assemblies.

SUMMARY

This section provides a general summary of the disclosure, and is not a comprehensive disclosure of its full scope or all of its features.

Exemplary embodiments are disclosed of power delivery (PD) assemblies, including powering, charging, and data connect devices usable within vehicles, etc. In exemplary embodiments, a power block (e.g., standalone power block, wireless charger, etc.) may be connected via a vehicle harness to a user interface (PD charger only) or a user interface (USB hub with charging and data). Accordingly, power blocks having the same or common form factor and vehicle harnesses having the same or common configuration (Vbus PD, GND, CC1, and CC2) may therefore be used to interchangeably connect to charging only user interfaces or to user interfaces with charging and data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals may indicate corresponding (although not necessarily identical) parts throughout the several views of the drawings.

DETAILED DESCRIPTION OF THE PREFERRED EMBODIMENTS

Example embodiments will now be described more fully with reference to the accompanying drawings.

Figure 1:
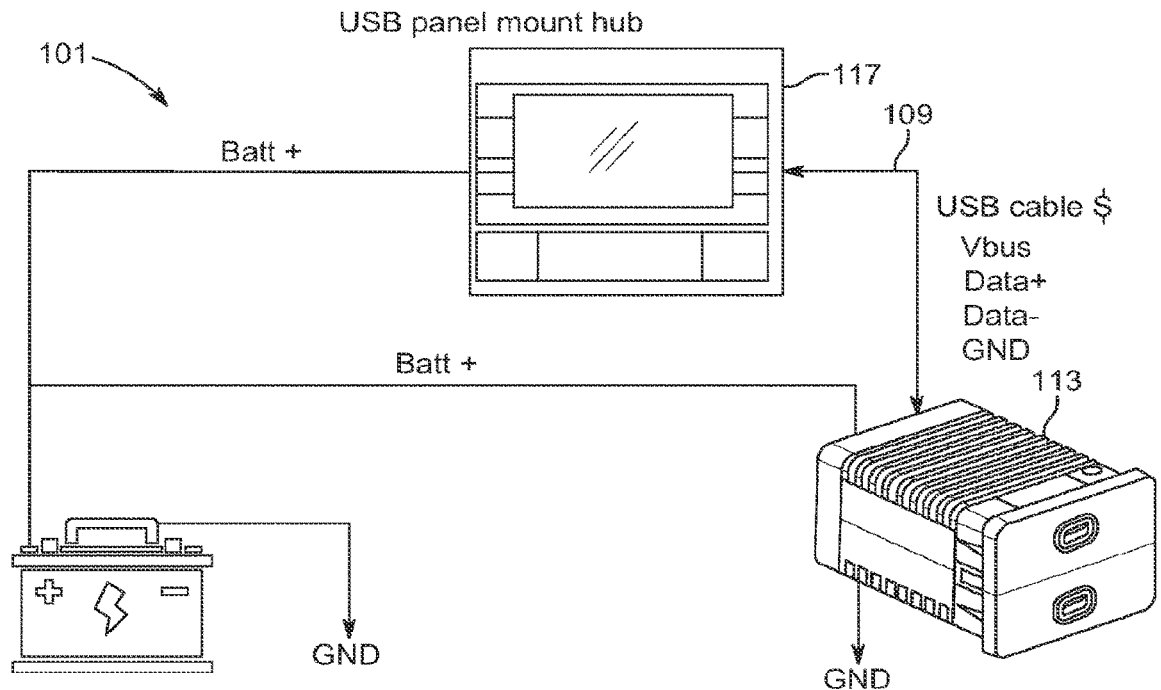
FIG. 1 illustrates a conventional USB panel mount hub and vehicle harness including a USB cable (Vbus, Data+, Data−, Ground (GND)) connected with a dual port USB user interface.

After recognizing the above limitations and drawbacks associated with the conventional USB panel mount hub 101 (FIG. 1), USB embedded hub 201 (FIG. 2), USB panel mount charger 301 (FIG. 3), and USB embedded charger 401 (FIG. 4), exemplary embodiments were developed and are disclosed herein of power delivery assemblies, including powering, charging, and data connect devices. For example, FIG. 6 illustrates an embedded power delivery architecture according to exemplary embodiments.

Figure 6:
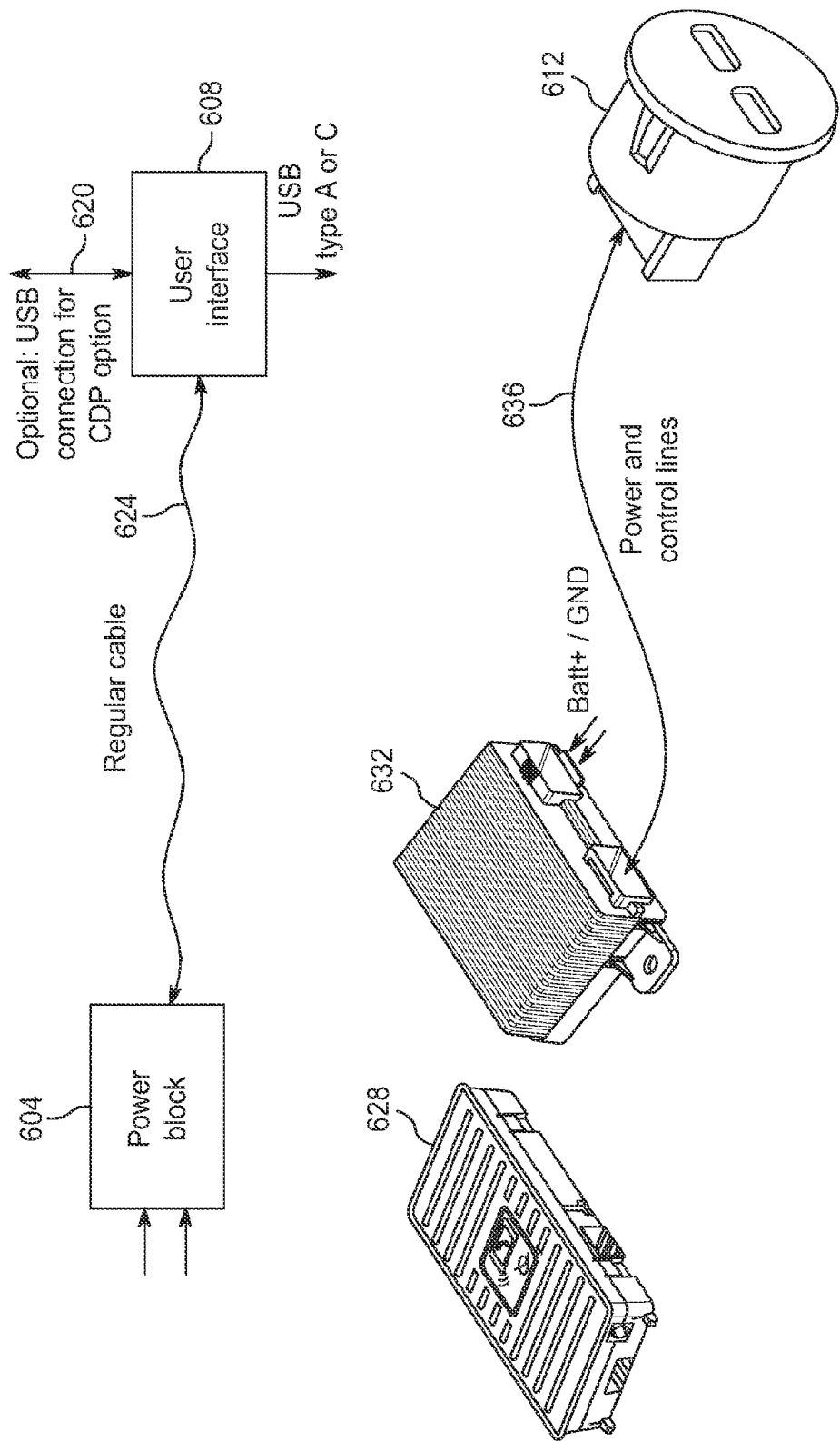
FIG. 6 illustrates an embedded power delivery architecture according to exemplary embodiments.

FIG. 6 generally represents the modular aspects or modularity achievable with exemplary embodiments of the present disclosure. As disclosed herein, a power block 604 (e.g., standalone power block, wireless charger, etc.) may be connected via a same vehicle harness to a user interface (charger only) 608 or a user interface (USB hub with charging and data) 612. Accordingly, power blocks having the same or common form factor and vehicle harnesses having the same or common configuration (Vbus PD, GND, CC1, and CC2) may therefore be used to interchangeably connect to charger only user interfaces or to user interfaces with charging and data.

The user interface 608 may include USB port(s) 616 that are Type A and/or Type C. The user interface 608 may also include a USB connection 620 for a CDP (charging downstream port) option. A regular cable 624 connects the power block 604 and the user interface (charger only) 608. Accordingly, high speed data lines are not required to connect the power block 604 and the user interface (charger only) 608.

In addition, a wireless charger 628 or a standalone power block 632 (e.g., embedded PD dual port power block, etc.) may be connected with the user interface (USB hub with charging and data) 612 via power and control lines 636. High speed data lines are not required to connect the wireless charger 628 or standalone power block 632 with the user interface (USB hub with charging and data) 612.

Figure 4:
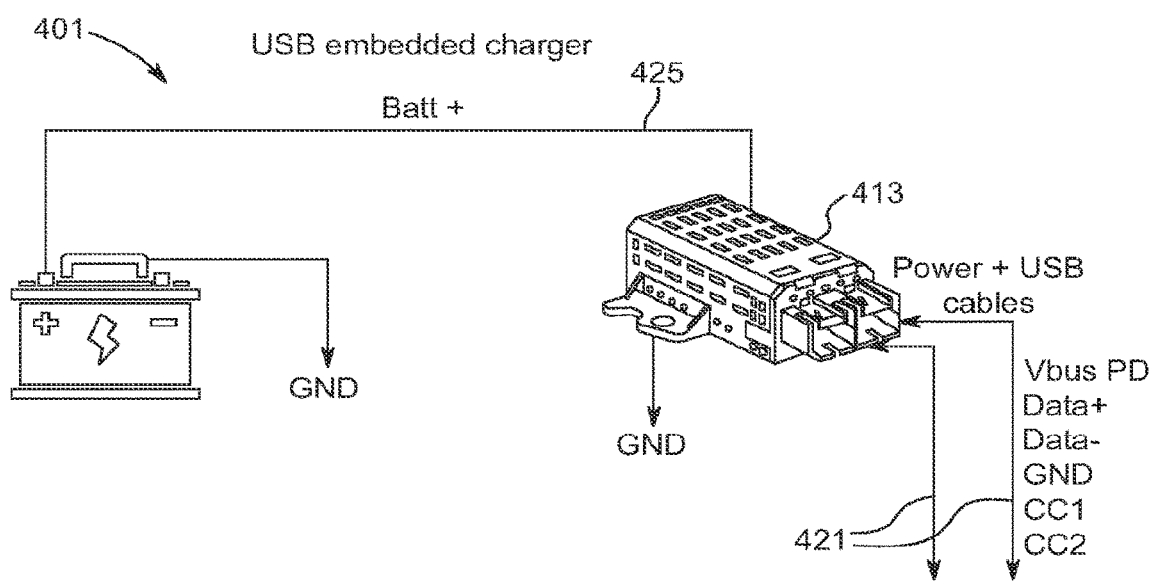
FIG. 4 illustrates a conventional USB embedded charger and vehicle harness including a battery cable and additional power/USB cables (Vbus PD, Data+, Data−, GND, CC1, CC2) connected with a dual port USB user interface.
Figure 5:
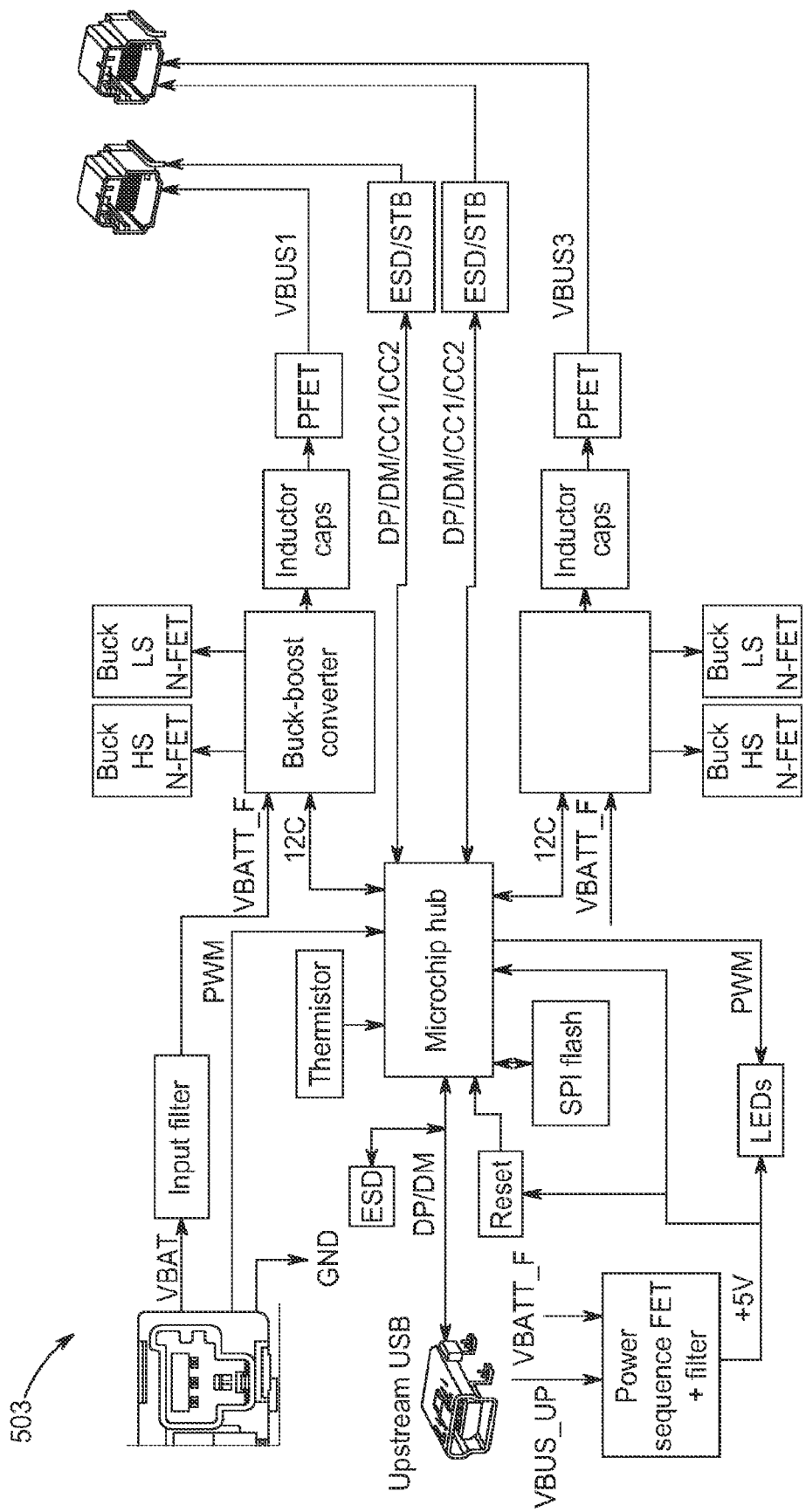
FIG. 5 is a block diagram of a conventional USB embedded hub as shown in FIG. 2.

Power block modules having the same/common form factor and vehicle harnesses having the same/common configuration (Vbus PD, GND, CC1, and CC2) may be connected to various user interfaces having different configurations, e.g., single port (A or C), two ports (A+C or C+C), four ports, standard 15 W, power delivery charger 30 W, 45 W, 60 W, or 100 W, circular form factors, MicoMCM form factor, panel mount single cable, DC/AC inverter, USB connection for CDP (charging downstream port) option, etc. This, in turn, provides modularity in that the same power block module and same vehicle harness may be connected with either user interface type (i.e., user interface (charger only) or user interface (USB hub with charging and data) without having to make changes to the vehicle configuration to accommodate for different power block modules and different vehicle harnesses for different user interface types. Reusing the same vehicle harnesses and power block modules for both user interface types also eliminates the need and additional costs of EMC (ElectroMagnetic Compatibility) testing of different designs. In other words, the reusable vehicle harness and modular power block module would not have to undergo repeated EMC testing. Conventional embedded solutions (e.g., USB embedded hub 201 (FIG. 2), USB embedded charger 401 (FIG. 4)) have been avoided traditionally due to their relatively high cost, e.g., expensive additional power/data cables 221 (FIG. 2) and 421 (FIG. 4). The reduced costs achievable with the modularity provided in exemplary embodiments disclosed herein may allow for lower cost embedded solutions than the conventional embedded solutions 201 (FIG. 2) and 401 (FIG. 4).

Figure 7:
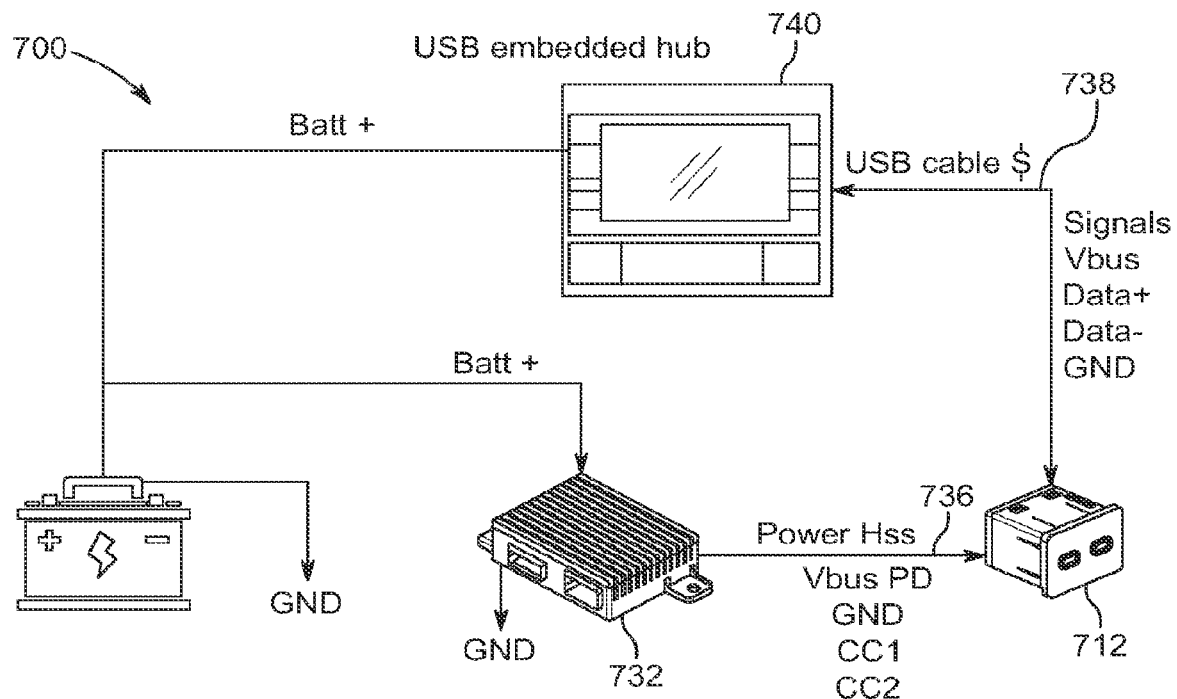
FIGS. 7 and 8 illustrate a vehicle harness (Vbus PD, GND, CC1, and CC2) connecting a power block with a user interface (USB hub with charging and data) in a USB embedded hub (FIG. 7) and with a user interface (charger only) in a USB embedded charger (FIG. 8) according to exemplary embodiments.

FIG. 7 illustrates a USB embedded hub 700 according to an exemplary embodiment. As shown, a vehicle harness 736 (Vbus PD, GND, CC1, and CC2) connects a power block 732 with a dual port user interface (USB hub with charging and data) 712. A USB cable 738 (Vbus, Data+, Data−, Ground (GND)) that extends between the user interface 712 and panel display 740.

Figure 8:
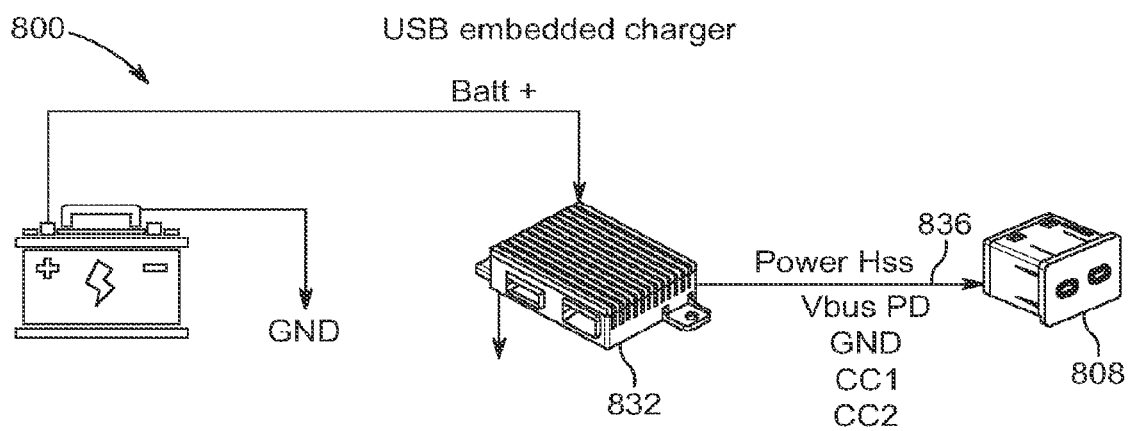

FIG. 8 illustrates a USB embedded charger 800 according to an exemplary embodiment. As shown, a vehicle harness 836 (Vbus PD, GND, CC1, and CC2) connects a power block 832 with a dual port user interface (charger only) 808.

FIGS. 7 and 8 collectively show that the same/common power block 732, 832 may be connected via the same/common vehicle harness 736, 836 to the user interface (USB hub with charging and data) 712 (FIG. 7) or to the user interface (charger only) 808 (FIG. 8). The power block may comprise a wireless charger and/or a standalone power block. The vehicle harness includes Vbus, GND, CC1, CC2 lines between the power block and user interface.

Figure 2:
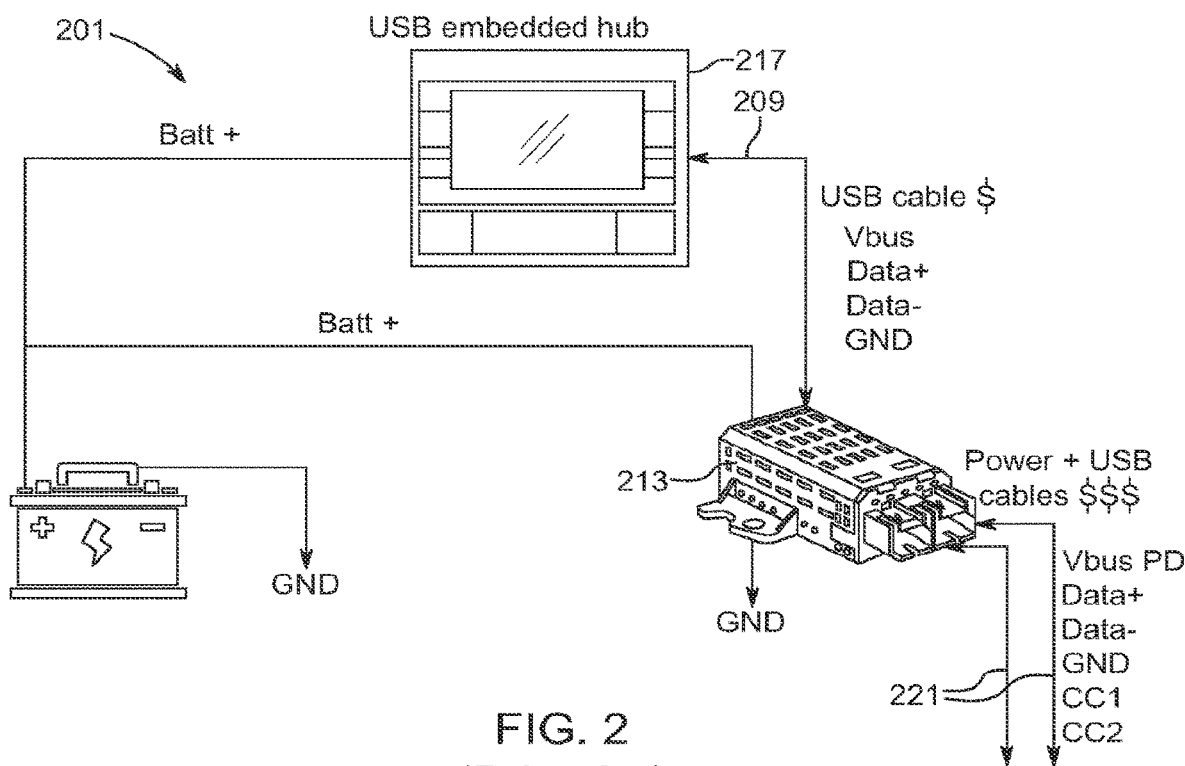
FIG. 2 illustrates a conventional USB embedded hub and vehicle harness including a USB cable (Vbus, Data+, Data−, Ground (GND)) and additional power/USB cables (Vbus PD, Data+, Data−, GND, CC1, CC2) connected with a dual port USB user interface.
Figure 3:
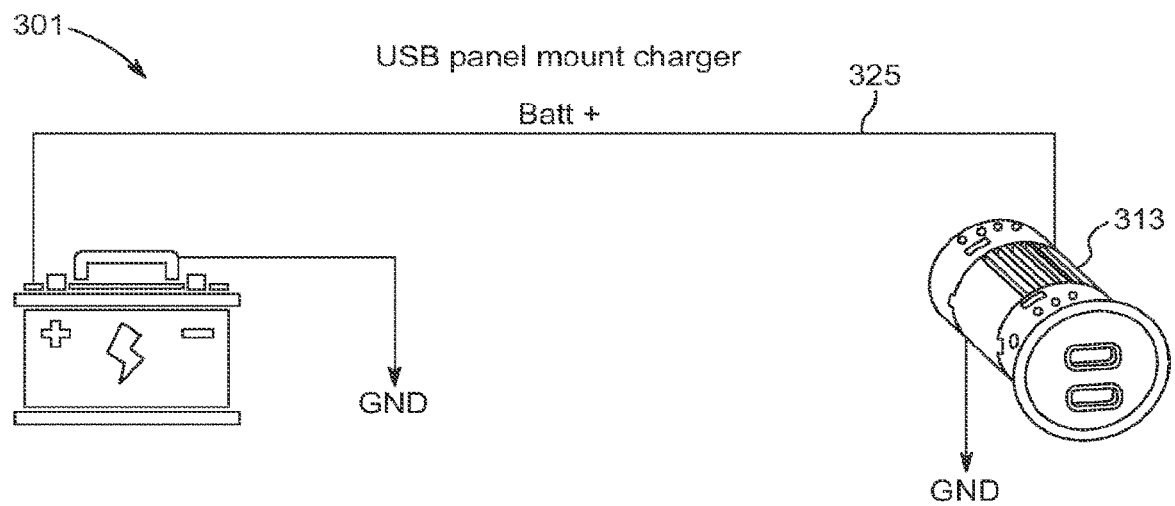
FIG. 3 illustrates a conventional USB panel mount charger and vehicle harness including a battery cable connected with a dual port USB user interface.

As compared to the conventional USB embedded hub 201 (FIG. 2), the USB embedded hub 700 (FIG. 7) may provide one or more (but not necessarily any or all) of the following advantages or features: avoid the use of expensive power/USB cables 221 in FIG. 2, etc.), avoid the constraints imposed by cable length and signal integrity, size and power dissipation is not significantly limited by mounting location, panel size, or surrounding components, lower cost than conventional USB embedded hub 201, reduced total system cost when power block is embedded with wireless charger, etc.

As compared to the conventional USB embedded charger 401 (FIG. 4), the USB embedded charger 800 (FIG. 8) may provide one or more (but not necessarily any or all) of the following advantages or features: avoid expensive cable use as termination (e.g., FIG. 11, etc.) is at the USB module, size and power dissipation is not significantly limited by mounting location, panel size or surrounding components, lower cost than the conventional USB embedded charger 401, greater flexibility provided by using the same/common power module (e.g., same/common vehicle harness and power block with same/common form factor) for USB hub or charger applications, reduced total system cost when power block is embedded with wireless charger, etc.

Figure 9:
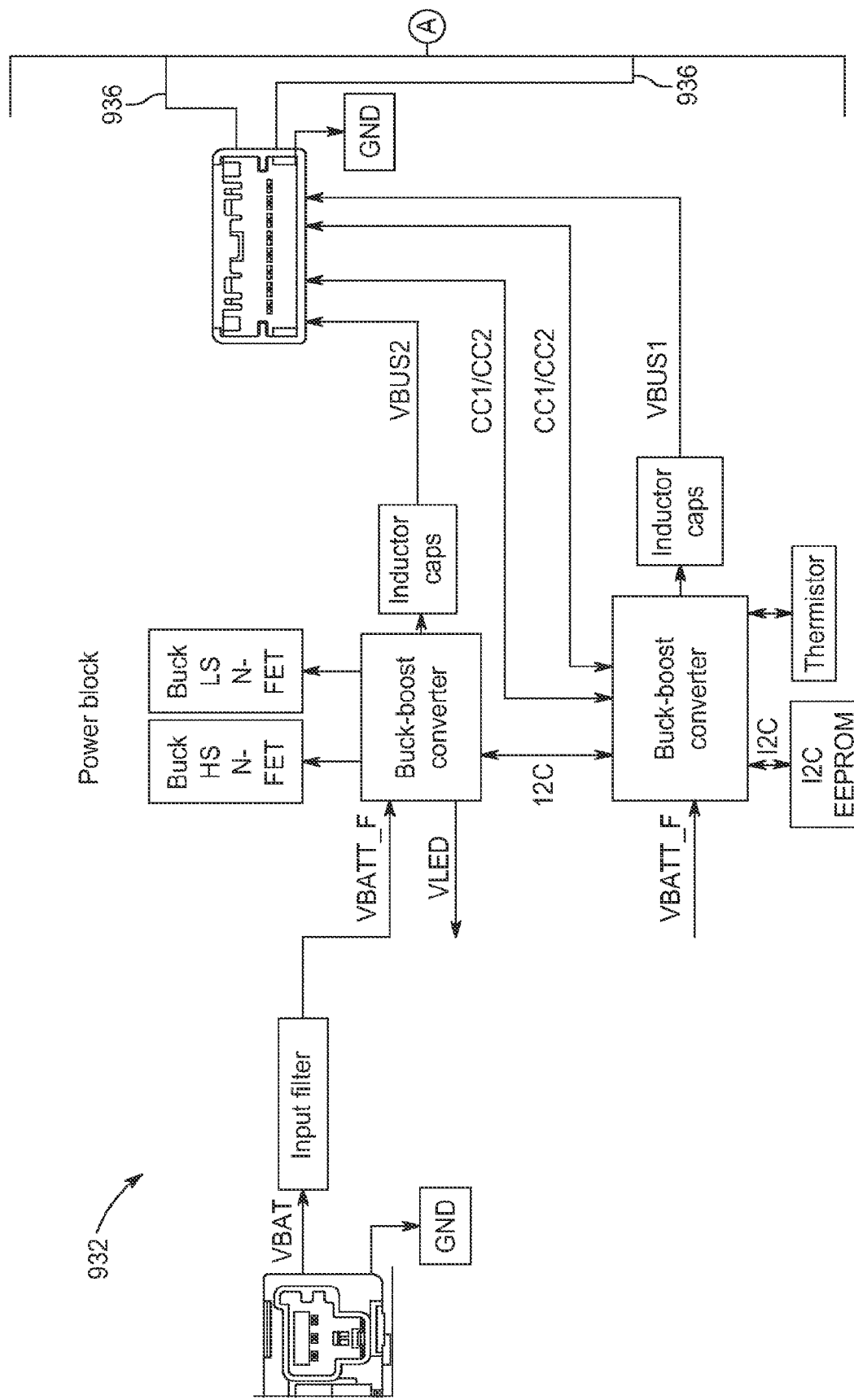
FIG. 9 is a block diagram of a power block, a user interface (charger only), and a user interface (USB hub with charging and data), and illustrating that the power block may be connected via the same vehicle harness to either the user interface (charger only) or the user interface (USB hub with charging and data) according to exemplary embodiments.
Figure 9:
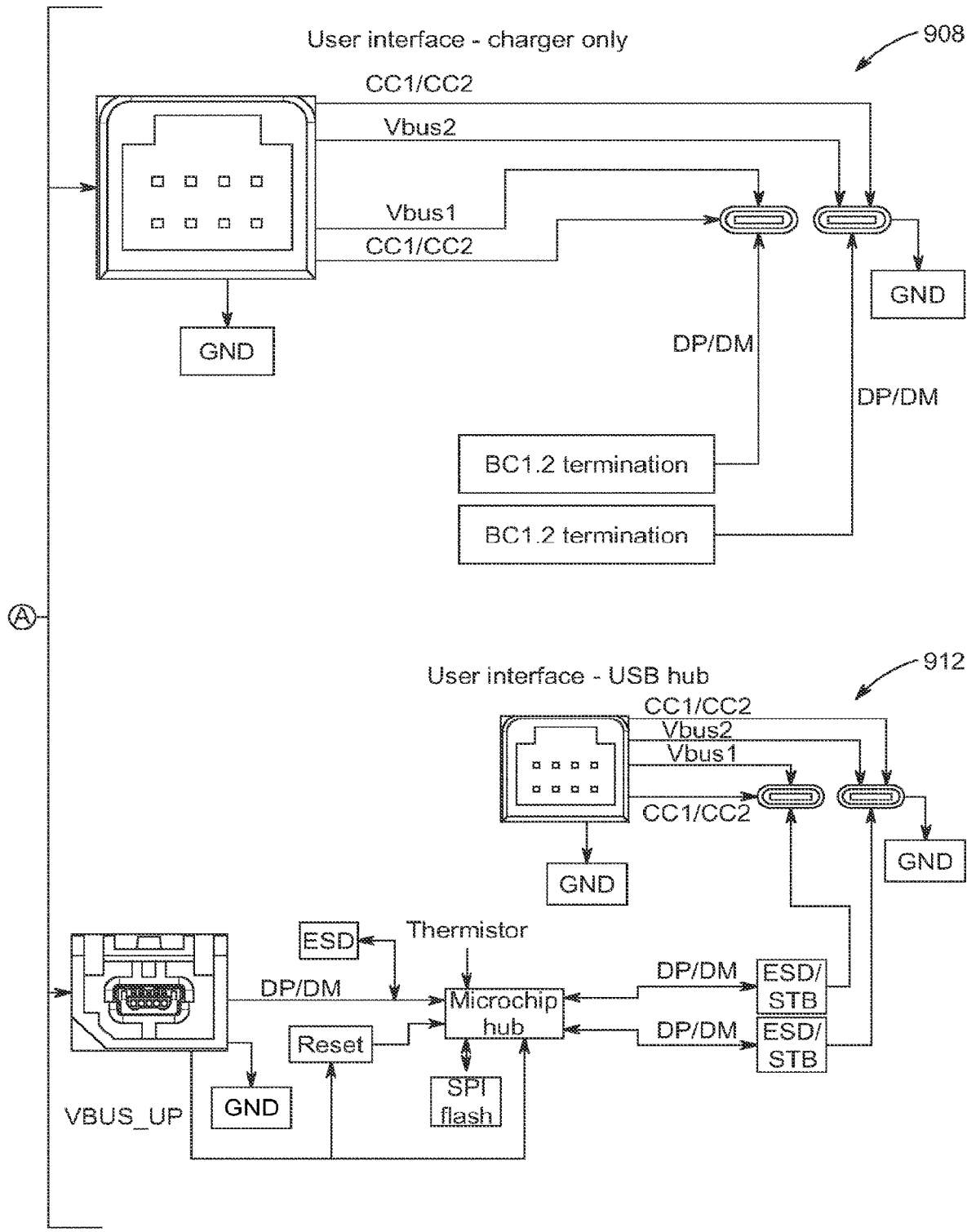

FIG. 9 illustrates a power block 932, a user interface (charger only) 908, and a user interface (USB hub with charging and data) 912 according to exemplary embodiments. As shown in FIG. 9, the power block 932 may be connected via the vehicle harness 936 to the user interface (charger only) 908 or to the user interface (USB hub with charging and data) 912.

The power block 932 may comprise a standalone module or be embedded as part of a wireless charger or other electronics control unit (ECU) in a vehicle. The vehicle harness 936 may include Vbus, GND, CC1, CC2 lines as shown in FIGS. 7 and 8 in which there are no high speed data lines between the power block and user interface.

Figure 10:
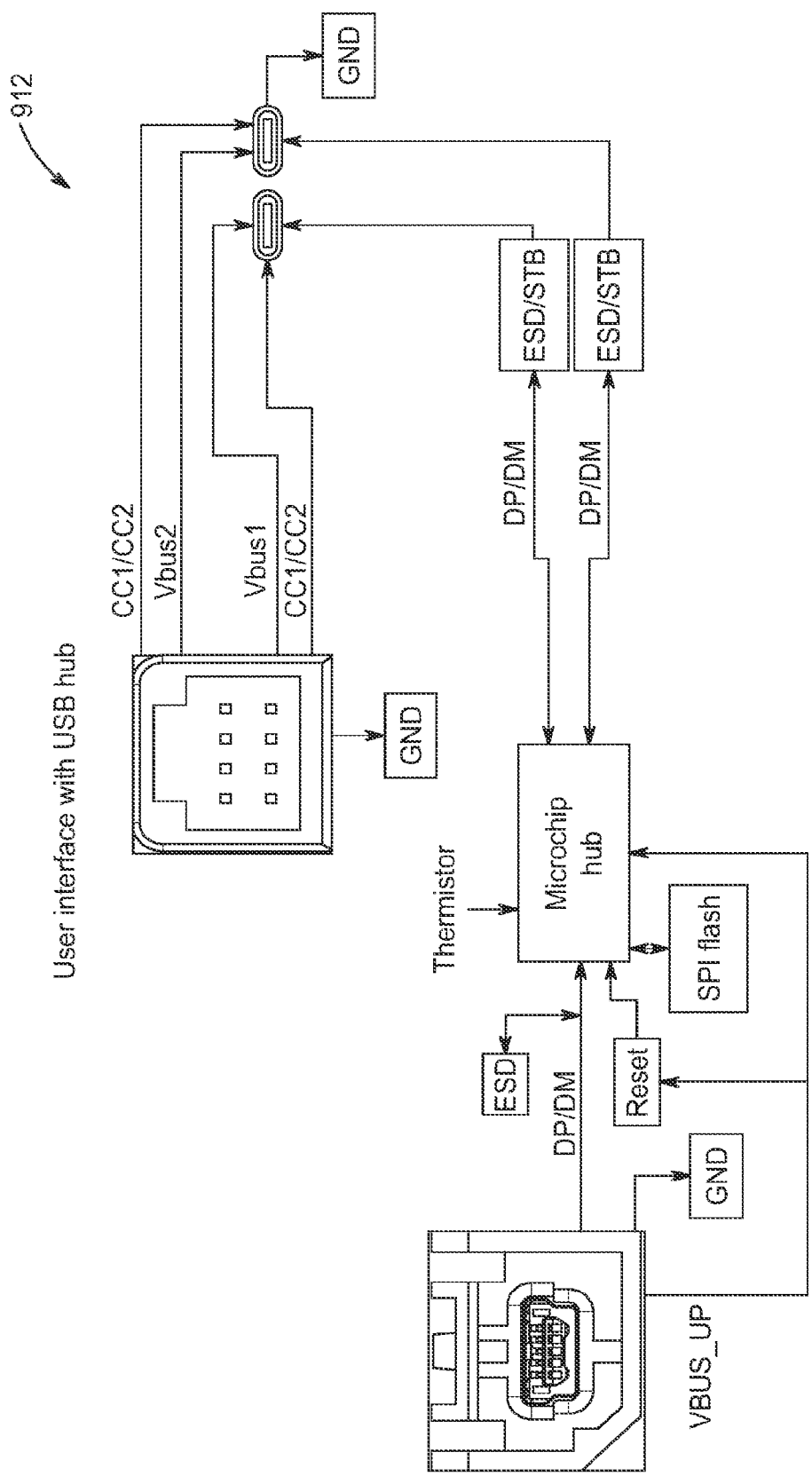
FIG. 10 is a block diagram of the user interface (USB hub with charging and data) shown in FIG. 9.

FIG. 10 illustrates the user interface (USB hub with charging and data) 912 also shown in FIG. 9. As shown in FIG. 10, the user interface 912 incorporates or includes connectors for receiving signals from the power block (Vbus, GND, CC1, CC2 per port). The user interface 912 with the USB hub also includes or incorporates connectors for receiving signals from the USB host (Vbus, DP/DM, GND). In addition, the user interface 912 with the USB hub includes a USB hub chip, USB type C connectors, and supporting circuitry for providing USB functionality and allows mirroring applications, such as Android Auto, Apple CarPlay, etc. Additional USB features can be supported, depending on the functionality provided by the included USB chipset.

Figure 11:
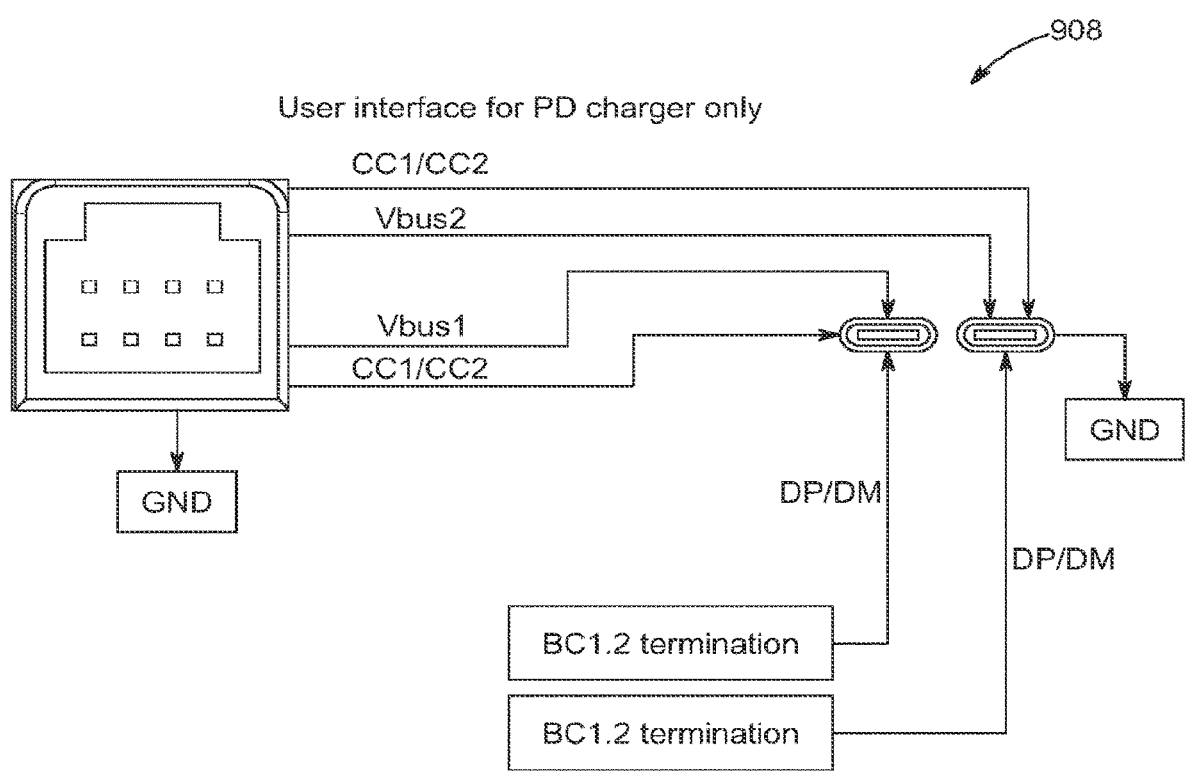
FIG. 11 is a block diagram of the user interface (charger only) shown in FIG. 9.

FIG. 11 illustrates the user interface (charger only) 908 also shown in FIG. 9. As shown in FIG. 11, the user interface 908 includes or incorporates connectors for receiving signals from the power block (Vbus, GND, CC1, CC2 per port). The user interface 908 also includes or incorporates BC1.2 termination and USB type C connectors for the user interface. This configuration eliminates the need for the use of expensive cables for high speed data, allows a small mechanical form factor, and avoids expensive EMC testing.

Figure 12:
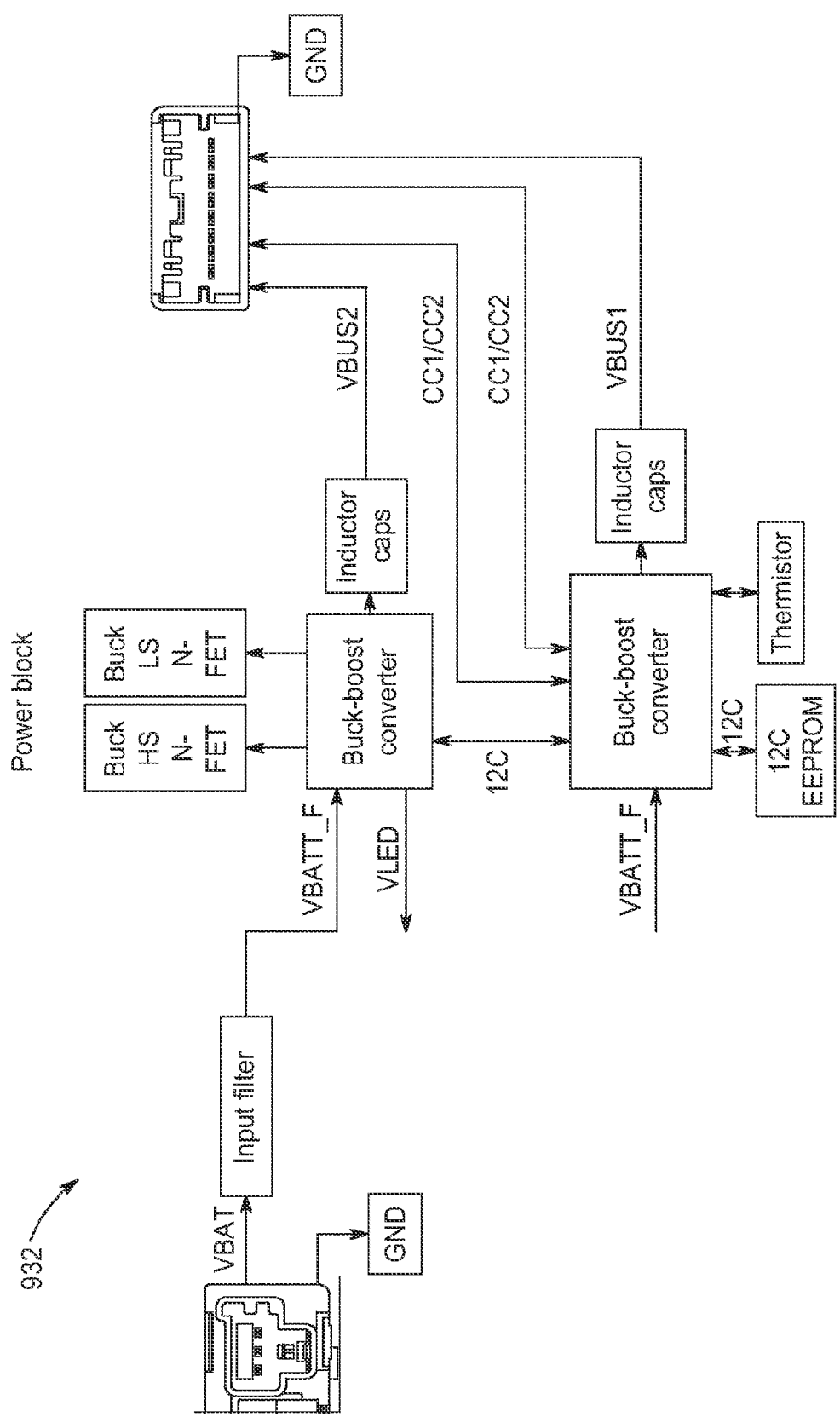
FIG. 12 is a block diagram of the power block shown in FIG. 9, which may be connected via the same vehicle harness shown in FIG. 8 to either the user interface (charger only) shown in FIG. 11 or the user interface (USB hub with charging and data) shown in FIG. 10.

FIG. 12 illustrates the power block 932 shown in FIG. 9 that may be connected via the vehicle harness 936 to the user interface (USB hub with charging and data) 912 (FIG. 10) or to the user interface (PD charger only) 908 (FIG. 11). As shown in FIG. 12, the power block 932 includes or incorporates the connector for receiving control signals from the vehicle (as required per application) and power lines (Batt+/−). The power block 932 is configured to convert the input voltage to the required voltage for USB power delivery. The power block 932 includes circuitry for protecting the electronic components. The power block 932 also includes a filter for the EMC noise generated by the conversion circuit. The power block 932 further includes the USB power delivery controller and output connector (Vbus, GND, CC1, CC2 per port).

FIGS. 13-17 illustrate vehicle configurations including embedded power delivery and embedded chargers according to exemplary embodiments. Generally, FIGS. 13-17 show the modularity achievable with exemplary embodiments in which power block modules having the same/common form factor and vehicle harnesses having the same/common configuration (Vbus PD, GND, CC1, and CC2) may be connected with either user interface type (i.e., user interface (PD charger only) or user interface (USB hub with charging and data) without having to make changes to the vehicle configuration to accommodate for different power block modules and different vehicle harnesses for different user interface types. As can be appreciated, each location within the vehicle can be modified to meet the desired configuration by adjust the number of charging ports being provided as well as the power level supported.

Figure 13:
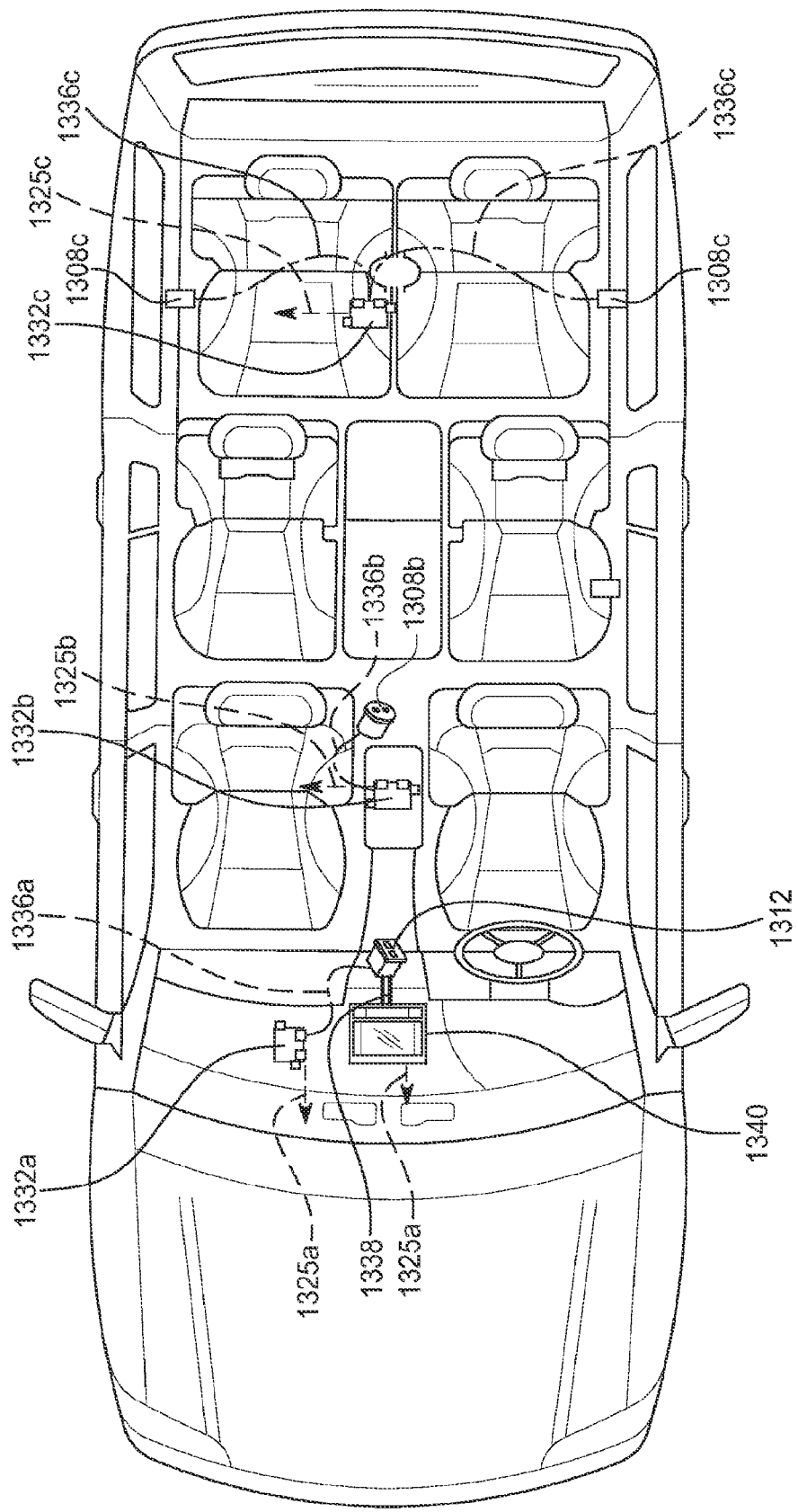
FIG. 13 illustrates an embodiment of a vehicle configuration including embedded power delivery and embedded chargers.

FIG. 13 shows an example vehicle configuration including three power blocks 1332a, 1332b, and 1332c. The first power block 1332a is being used for a USB hub and dual power delivery (PD) up to 60 W per port. A USB cable 1338 connects the USB hub 1340 and the dual port user interface (USB hub with charging and data) 1312. A vehicle harness 1336a (Vbus PD, GND, CC1, and CC2) connects the first power block 1332a and the dual port user interface 1312. The second power block 1332b is being used for a dual PD port (charger only) up to 60 W per port. A vehicle harness 1336b (Vbus PD, GND, CC1, and CC2) connects the second power block 1332b and the dual PD port user interface 1308b. The third power block 1332c is being used for two single PD ports (charger only) up to 15 W per port. Vehicle harnesses 1336c (Vbus PD, GND, CC1, and CC2) connect the third power block 1332c with the single PD port user interfaces 1308c. FIG. 13 also shows battery connections 1325a, 1325b, and 1325c.

Figure 14:
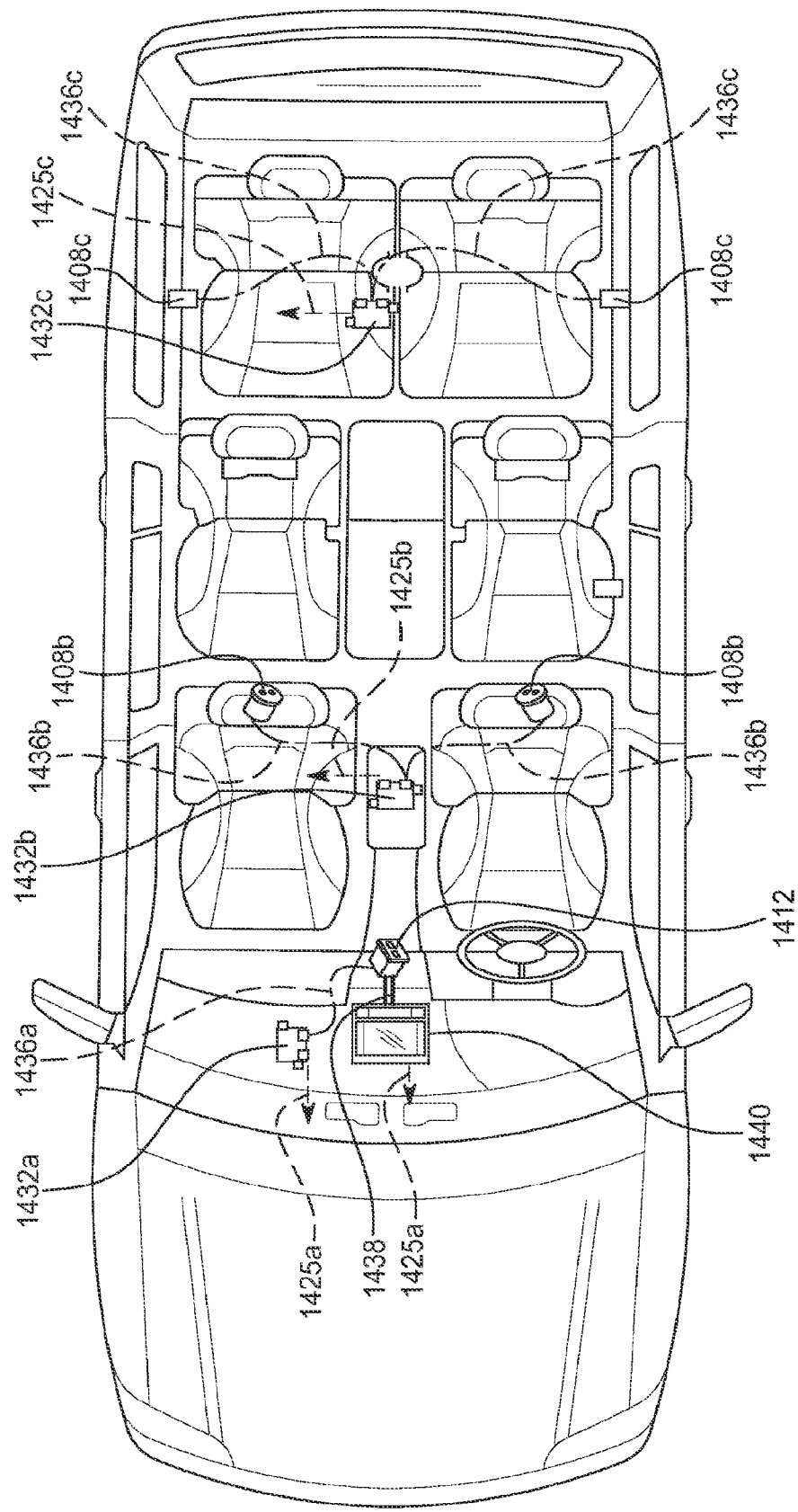
FIG. 14 illustrates another embodiment of a vehicle configuration including embedded power delivery and embedded chargers.

FIG. 14 shows an example vehicle configuration including three power blocks 1432a, 1432b, and 1432c. The first power block 1432a is being used for a USB hub and dual power delivery (PD) up to 60 W per port. A USB cable 1438 connects the USB hub 1440 and the dual port user interface (USB hub with charging and data) 1412. A vehicle harness 1436a (Vbus PD, GND, CC1, and CC2) connects the first power block 1432a and the dual port user interface 1412. The second power block 1432b is being used for two single PD ports (charger only) up to 60 W per port. Vehicle harnesses 1436b (Vbus PD, GND, CC1, and CC2) connect the second power block 1432b with the single PD port user interfaces 1408b. The third power block 1432c is being used for two single PD ports (charger only) up to 15 W per port. Vehicle harnesses 1436c (Vbus PD, GND, CC1, and CC2) connect the third power block 1432c with the single PD port user interfaces 1408c. FIG. 14 also shows battery connections 1425a, 1425b, and 1425c.

Figure 15:
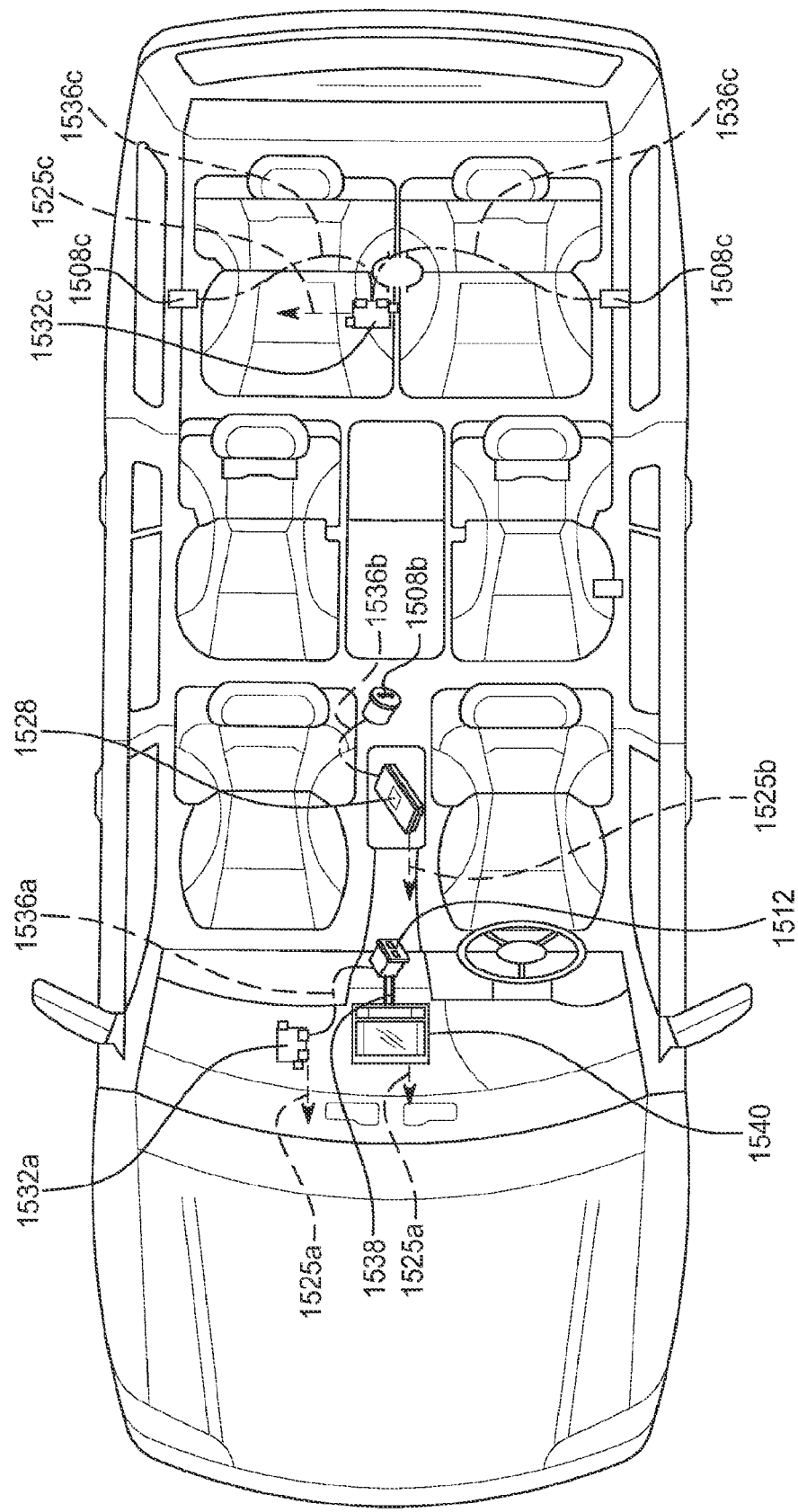
FIG. 15 illustrates another embodiment of a vehicle configuration including embedded power delivery and embedded chargers.

FIG. 15 shows an example vehicle configuration including two power blocks 1532a, 1532c and a wireless charger 1528. The first power block 1532a is being used for a USB hub and dual power delivery (PD) up to 60 W per port. A USB cable 1538 connects the USB hub 1540 and the dual port user interface (USB hub with charging and data) 1512. A vehicle harness 1536*a* (Vbus PD, GND, CC1, and CC2) connects the first power block 1532*a* and the dual port user interface 1512. The wireless charger 1528 is being used for a dual PD port (charger only) up to 60 W per port. A vehicle harness 1536*b* (Vbus PD, GND, CC1, and CC2) connects the wireless charger 1528 and the dual PD port user interface 1508*b*. The second power block 1532*c* is being used for two single PD ports (charger only) up to 15 W per port. Vehicle harnesses 1536*c* (Vbus PD, GND, CC1, and CC2) connect the second power block 1532*c* with the single PD port user interfaces 1508*c*. FIG. 15 also shows battery connections 1525*a*, 1525*b*, and 1525*c*.

Figure 16:
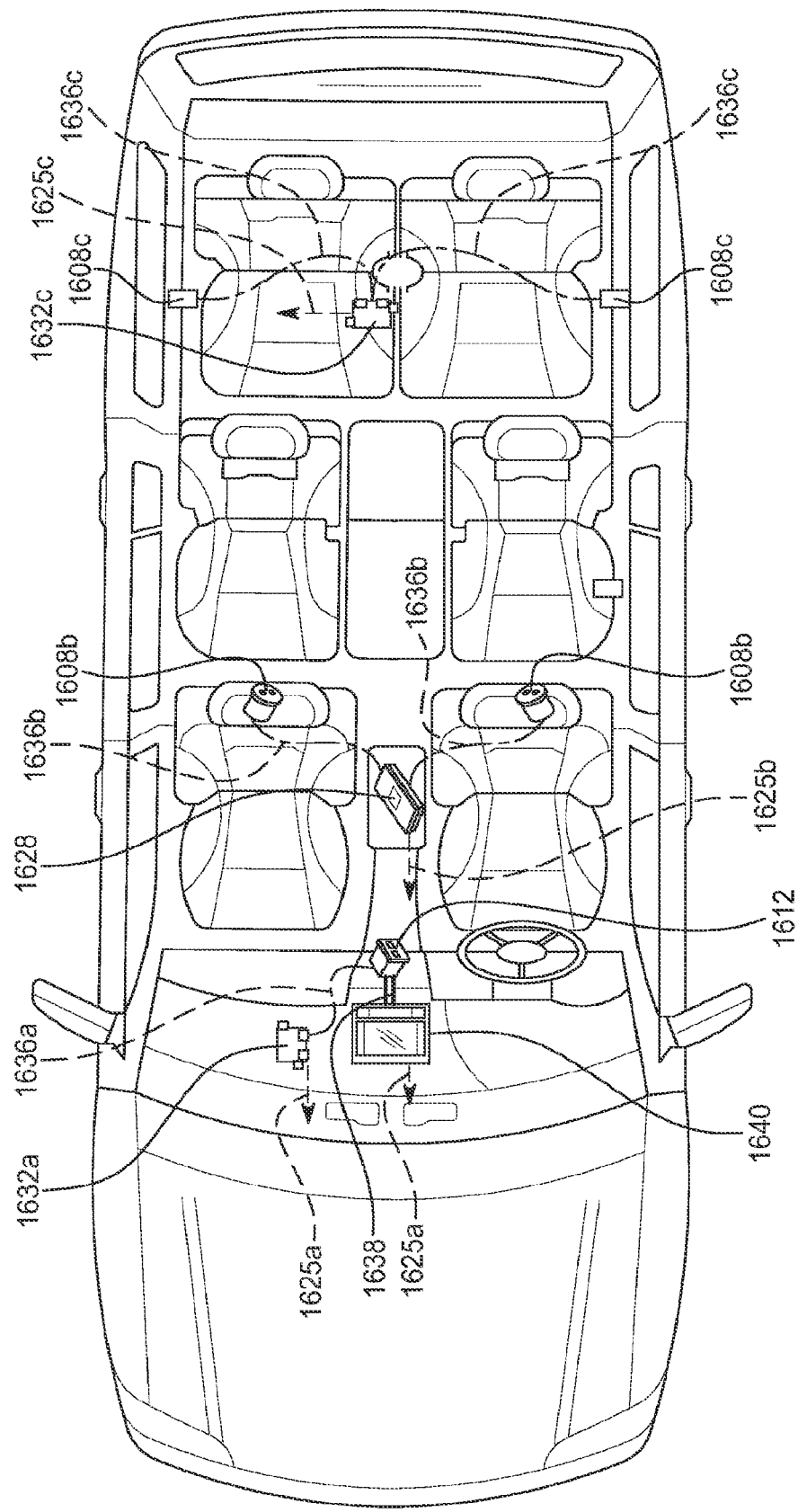
FIG. 16 illustrates another embodiment of a vehicle configuration including embedded power delivery and embedded chargers.

FIG. 16 shows an example vehicle configuration including two power blocks 1632*a*, 1632*c* and a wireless charger 1628. The first power block 1632*a* is being used for a USB hub and dual power delivery (PD) up to 60 W per port. A USB cable 1638 connects the USB hub 1640 and the dual port user interface (USB hub with charging and data) 1612. A vehicle harness 1636*a* (Vbus PD, GND, CC1, and CC2) connects the first power block 1632*a* and the dual port user interface 1612. The wireless charger 1628 is being used for two single PD ports (charger only) up to 60 W per port. Vehicle harnesses 1636*b* (Vbus PD, GND, CC1, and CC2) connect the wireless charger 1628 with the single PD port user interfaces 1608*b*. The second power block 1632*c* is being used for two single PD ports (charger only) up to 15 W per port. Vehicle harnesses 1636*c* (Vbus PD, GND, CC1, and CC2) connect the second power block 1632*c* with the single PD port user interfaces 1608*c*. FIG. 16 also shows battery connections 1625*a*, 1625*b*, and 1625*c*.

Figure 17:
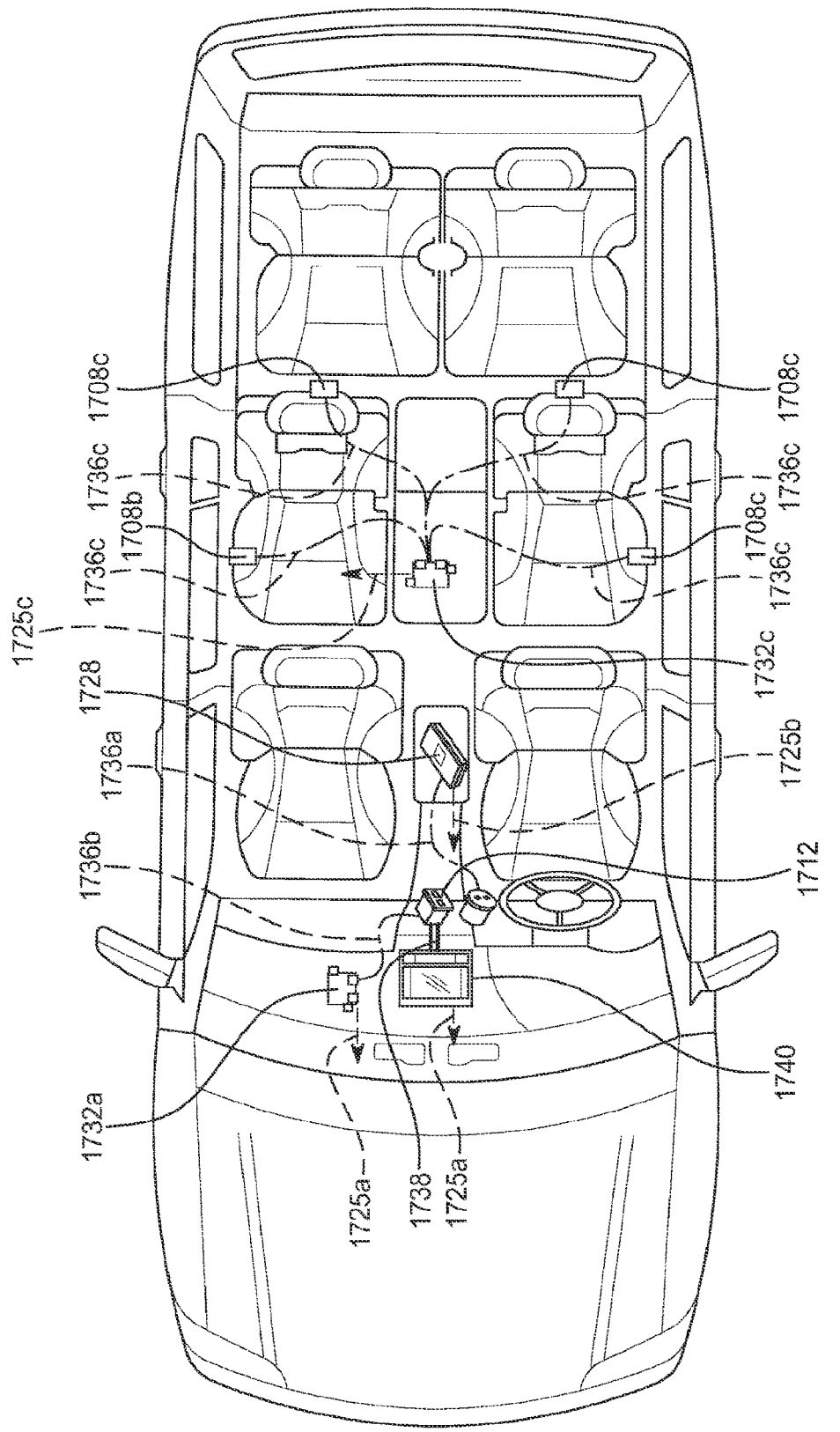
FIG. 17 illustrates another embodiment of a vehicle configuration including embedded power delivery and embedded chargers

FIG. 17 shows an example vehicle configuration including two power blocks 1732*a*, 1732*c* and a wireless charger 1728. The first power block 1732*a* is being used for a USB hub, 60 W power delivery (PD) plus 15 W. A USB cable 1738 connects the USB hub 1740 and the dual port user interface (USB hub with charging and data) 1712. A vehicle harness 1736*a* (Vbus PD, GND, CC1, and CC2) connects the first power block 1732*a* and the dual port user interface 1712. The wireless charger 1728 is being used for dual port (charger only), 60 W power delivery (PD) plus 15 W. A vehicle harness 1736*b* (Vbus PD, GND, CC1, and CC2) connects the wireless charger 1728 and the dual PD port user interface 1708*b*. The second power block 1732*c* is being used for four single PD ports (charger only) up to 15 W per port. Vehicle harnesses 1736*c* (Vbus PD, GND, CC1, and CC2) connect the second power block 1732*c* with the single PD port user interfaces 1708*c*. FIG. 17 also shows battery connections 1725*a*, 1725*b*, and 1725*c*.

Figure 18:
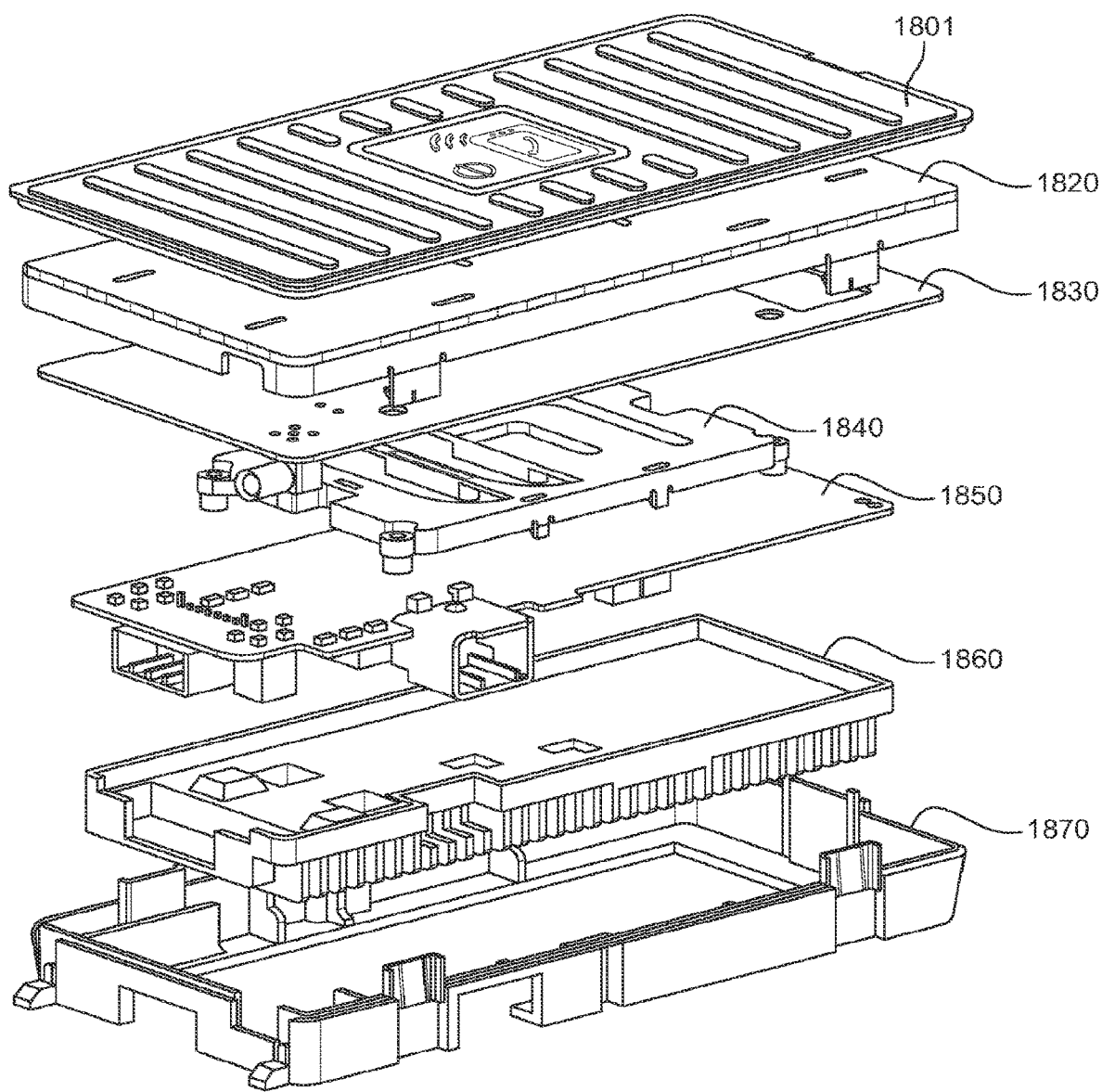
FIG. 18 shows an embodiment of a combination wireless charger and a power block integrated into a single housing.

FIG. 18 shows an embodiment of a combination wireless charger and a power block integrated into a single housing. A pad 1810 is provided to accept a portable device is that is going to receive power wirelessly. The pad can be shaped as desired to hold the portable device and thus while a simple design is shown, more complex 3-dimensional shapes would also be suitable. A first housing portion 1820 and second housing portion 1870 are provided to help support the internal components. A first substrate 1830, which can be formed of conventional circuit board material or any other desirable substrate material, can provide a desired level of shielding. A transmission coil module 1840 is provided to transmit the power to the portable device and can be one or more individual coils that provide the wireless power transmission. A second substrate 1850 is provided, which can be constructed in a similar manner as substrate 1830, and can include circuitry to support wireless power delivery along with circuitry to provide a power block as discussed above. Due to the increased complexity, the second substrate may have additional layers to provide for the necessary communication and power delivery between the different components mounted thereon. Naturally for higher power levels thermal issues become and issue and it may be desirable to place the power block circuitry on a separate substrate to help space out thermal sources but such configuration modifications are known in the art and thus not discussed herein. A heatsink 1860 is provided to help dissipate thermal energy generated by the power block circuitry and the wireless power delivery circuitry. The size and configuration of the heatsink will naturally be adjusted to meet the cooling requirements in a known fashion. One benefit of such a design is that, assuming thermal issues are appropriately managed, it is possible to reduce the overall cost of the system by sharing components that might otherwise need to be entirely duplicated.

In exemplary embodiments, a power delivery assembly includes a power block, a user interface module, and a harness. The power block includes one or more connectors for Vbus, GND, CC1, and CC2 lines per port to support power delivery (PD). The user interface module is configured to be operable as a USB hub with Power Delivery (PD), or as a charger only with Power Delivery (PD). The harness is configured to interconnect the power block with the user interface module regardless of whether the user interface module is configured to be operable as a USB hub with Power Delivery (PD) or as a charger only with Power Delivery (PD). The power delivery assembly may also include a high-speed data cable configured to connect the user interface module with a host for a USB hub application.

The user interface module may include a first user interface module configured to be operable as a USB hub with Power Delivery (PD), and a second user interface module configured to be operable as a charger only with Power Delivery (PD). In which case, the power block may be selectively interconnected via the harness with a selected one of the first user interface module and the second user interface module.

The user interface module may include one or more first user interface modules configured to be operable as a USB hub with Power Delivery (PD), and one or more second user interface modules configured to be operable as a charger only with Power Delivery (PD). The power block may include a plurality of power blocks each having a same or common form factor. The harness may include a plurality of vehicle harnesses each having a same or common configuration for interconnecting the power blocks with the first and second user interface modules. Each said power block may be selectively interconnectable via any one of the vehicle harnesses with any one of the first and second user interface modules without having to make changes to vehicle configuration to accommodate for different power block modules and/or for different vehicle harnesses for different user interface types.

The user interface module may include at least one first user interface module configured to be operable as a USB hub with Power Delivery (PD) that includes an input connector for receiving the Vbus, GND, CC1, and CC2 lines per port from the power block; an input connector for high speed USB data lines; an electronic circuit including a USB hub and circuitry for providing USB functionality; and a USB type C connector per port to interface with an end user device. The at least one first user interface module may also include a printed circuit board assembly including one or more electronic circuits; and a mechanical enclosure configured to protect the one or more electronic circuits of the printed circuit board assembly.

The user interface module may include a second user interface module configured to be operable as a charger only with Power Delivery (PD) that includes an input connector for receiving the Vbus, GND, CC1, and CC2 lines per port from the power block; an electronic circuit per port to terminate DP/DM lines from an end user device; and a USB type C connector per port to interface with an end user device. The at least one second user interface module may further include a printed circuit board assembly including one or more electronic circuits; and a mechanical enclosure configured to protect the one or more electronic circuits of the printed circuit board assembly.

The power block may include one or more input connectors for receiving power, control, and/or communication lines from a vehicle; an input filter to support vehicle transients and clean electromagnetic noise generated by the power block; a switching mode DC-DC converter per port to generate a voltage required by USB power delivery (PD); a USB power delivery (PD) controller per port to drive the switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The power delivery assembly may include a wireless charger including the power block and further including one or more coils to transfer power wirelessly to a device under charge; an antenna and circuit to communicate with the device under charge; one or more input connectors for receiving power, control, and/or communication lines from a vehicle; an input filter to support vehicle transients and clean electromagnetic noise generated by the wireless charger; a first switching mode DC-DC converter to provide power to the one or more coils; a second switching mode DC-DC converter per port to generate a voltage required by USB power delivery (PD); a USB power delivery (PD) controller per port to drive the first and/or second switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The power block may include a printed circuit board assembly including one or more electronic circuits; and a mechanical enclosure configured to dissipate heat and/or to protect the one or more electronic circuits of the printed circuit board assembly.

The power block may be embedded within an electronic control unit (ECU) of a vehicle. The electronic control unit (ECU) of the vehicle may include a wireless charger. Or, the power block may comprise a standalone power module.

In exemplary embodiments, a system includes a plurality of power blocks each having a same or common form factor; a plurality of first user interface modules each configured to be operable as a USB hub with Power Delivery (PD); a plurality of second user interface modules each configured to be operable as a charger only with Power Delivery (PD); and a plurality of vehicle harnesses each having a same or common configuration for interconnecting a selected one of the power blocks with a selected one of the first and second user interface modules. Each said power block may be selectively interconnectable via any one of the vehicle harnesses with any one of the first and second user interface modules without having to make changes to vehicle configuration to accommodate for different power block modules and/or for different vehicle harnesses for different user interface types.

The system may further include one or more high-speed data cables configured to connect a corresponding one or more of the first user interface modules with a host for a USB hub application.

Each said first user interface module may include an input connector for receiving Vbus, GND, CC1, and CC2 lines per port from the power block; an input connector for high speed USB data lines; an electronic circuit including a USB hub and circuitry for providing USB functionality; and a USB type C connector per port to interface with an end user device.

Each said second user interface module may include an input connector for receiving Vbus, GND, CC1, and CC2 lines per port from the power block; an electronic circuit per port to terminate DP/DM lines from an end user device; and a USB type C connector per port to interface with an end user device.

Each said power block may include one or more input connectors for receiving power, control, and/or communication lines from a vehicle; an input filter to support vehicle transients and clean electromagnetic noise generated by the power block; a switching mode DC-DC converter per port to generate a voltage required by USB power delivery (PD); a USB power delivery (PD) controller per port to drive the switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The system may include a plurality of wireless chargers each including a corresponding one of the power blocks and further including one or more coils to transfer power wirelessly to a device under charge; an antenna and circuit to communicate with the device under charge; one or more input connectors for receiving power, control, and/or communication lines from a vehicle; an input filter to support vehicle transients and clean electromagnetic noise generated by the wireless charger; a first switching mode DC-DC converter to provide power to the one or more coils; a second switching mode DC-DC converter per port to generate a voltage required by USB power delivery (PD); a USB power delivery (PD) controller per port to drive the first and/or second switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The plurality of power blocks may be embedded within electronic control units (ECU) of vehicles and/or comprise standalone power modules.

In exemplary embodiments, a method includes selecting a power block from a plurality of power blocks each having a same or common form factor; selecting a user interface module from a plurality of first user interface modules each configured to be operable as a USB hub with Power Delivery (PD) and a plurality of first user interface modules each configured to be operable as a charger only with Power Delivery (PD); and selecting a vehicle harness from a plurality of vehicle harnesses each having a same or common configuration; and interconnecting the selected power block with the selected user interface module via the selected vehicle harness. Each said power block is selectively interconnectable via any one of the vehicle harnesses with any one of the first and second user interface modules without having to make changes to vehicle configuration to accommodate for different power block modules and/or for different vehicle harnesses for different user interface types.

The method may further include using one or more high-speed data cables to connect a corresponding one or more of the first user interface modules with a host for a USB hub application.

Each said first user interface module may include an input connector for receiving Vbus, GND, CC1, and CC2 lines per port from the power block; an input connector for high speed USB data lines; an electronic circuit including a USB hub and circuitry for providing USB functionality; and a USB type C connector per port to interface with an end user device.

Each said second user interface module may include an input connector for receiving Vbus, GND, CC1, and CC2 lines per port from the power block; an electronic circuit per port to terminate DP/DM lines from an end user device; and a USB type C connector per port to interface with an end user device.

Each said power block may include one or more input connectors for receiving power, control, and/or communication lines from a vehicle; an input filter to support vehicle transients and clean electromagnetic noise generated by the power block; a switching mode DC-DC converter per port to generate a voltage required by USB power delivery (PD); a USB power delivery (PD) controller per port to drive the switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The plurality of power blocks may be included with a plurality of wireless chargers each further comprising one or more coils to transfer power wirelessly to a device under charge; an antenna and circuit to communicate with the device under charge; one or more input connectors for receiving power, control, and/or communication lines from a vehicle; an input filter to support vehicle transients and clean electromagnetic noise generated by the wireless charger; a first switching mode DC-DC converter to provide power to the one or more coils; a second switching mode DC-DC converter per port to generate a voltage required by USB power delivery (PD); a USB power delivery (PD) controller per port to drive the first and/or second switching mode DC-DC converter and communicate with an end user device via CC1 and CC2 lines; electrostatic discharge (ESD) protection for signal and power lines (Vbus, GND, CC1 and CC2) per port; and an output connector to connect with the harness.

The plurality of power blocks may be embedded within electronic control units (ECU) of vehicles and/or comprise standalone power modules.

Exemplary embodiments of power delivery assemblies disclosed herein may provide or include one or more (but not necessarily any or all) of the following advantages or features. For example, exemplary embodiments may include power modules and user interfaces configured to be physically separate, such that the same/common power module may be used for many types of charging and/or data (USB, for example) systems, thereby creating a higher volume/lower cost device that can be part of a great variety of customized systems. The power module can include, for example, wireless charging functionality, USB hub functionality, and USB charging support. For example, an embedded power box may include an input power connector, input filter, DC-DC converter (Buck to support 5v output or Buck boost to support PD), PD controller per port, and standard output connector per port. For the user interface, an example module may include the user interface and the mechanical form factor needed for panel mounting (e.g., cosmetic or non-cosmetic). This example user interface module may include an input connector (power and signal lines coming from the power block), a USB 2.0 controller (termination for D+/− for charger applications, resistor to support BC1.2 for legacy), and USB hub for applications with charger plus data.

The desired user interfaces may be connected to the power module but are usually located or positioned remotely from the power module. Thermal issues can be addressed (e.g., via thermal interface materials, heat spreaders, heat sinks, etc.) in the power module design and at the power module location rather than integrally with or in the user interfaces or at their respective locations. This, in turn, allows the user interfaces to be light weight and low profile thereby providing improved flexibility in the placement and location of the user interfaces. In exemplary embodiments, the integration of wireless charging and power delivery charging can offer system benefits for total vehicle consumer device charging solution, e.g., in the front row and $2^{nd}$ row, etc.

Exemplary embodiments include common power blocks having the same connection interface and form factor for all options to allow upgrades to move from standard USB charger to power delivery (PD), different power levels, and different variants. In exemplary embodiment, a power block may be incorporated in a wireless charger, which may allow for the use of common blocks (e.g., input connector and filter and integrating PD controller).

In exemplary embodiments, the user interfaces may have a relatively small size and/or be configured to fit complex areas or areas sensate to power dissipation (e.g., seats, armrest, cup holders, doors, etc.). Exemplary embodiments may be configured to allow for easy customization for user interface form factor. In exemplary embodiments, the same or common interface may be used for a charger and then escalate to power delivery, which allow a charger to be interchanged to a USB hub version by changing the user interface block. In exemplary embodiments, the connection from the power block to the user interface may be part of the vehicle harness.

In exemplary embodiments, a power delivery assembly may be configured to provide USB power delivery up to 60 Watts or 100 Watts, such that the power delivery assembly may be operable for powering a wide range of electronic devices, may allow for easier USB power delivery compliance/certification, and/or may be more cost effective.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A Power Delivery assembly comprising:
    a power block including one or more connectors for Vbus, GND, CC1, and CC2 lines per port to support Power Delivery (PD);

a user interface module configured to be operable as a USB hub with Power Delivery (PD) or as a charger only with Power Delivery (PD); and a harness configured to interconnect the power block with the user interface module regardless of whether the user interface module is configured to be operable as the USB hub with Power Delivery (PD) or as the charger only with Power Delivery (PD);

wherein the Power Delivery assembly comprises a wireless charger including the power block and further comprising one or more coils configured to transfer power wirelessly to a device under charge.

2. The Power Delivery assembly of claim 1, wherein:

the user interface module comprises one or more first user interface modules configured to be operable as a USB hub with Power Delivery (PD), and one or more second user interface modules configured to be operable as a charger only with Power Delivery (PD); and the Power Delivery assembly comprises a plurality of power blocks each having a same or common form factor; and the harness comprises a plurality of vehicle harnesses each having a same or common configuration for interconnecting the power blocks with the first and second user interface modules.

3. The Power Delivery assembly of claim 2, wherein each said power block is selectively interconnectable via any one of the vehicle harnesses with any one of the first and second user interface modules without having to make changes to vehicle configuration to accommodate for different power block modules and/or for different vehicle harnesses for different user interface types.

4. The Power Delivery assembly of claim 3, wherein the user interface module comprises at least one first user interface module configured to be operable as a USB hub with Power Delivery (PD), the at least one first user interface including:

an input connector for receiving the Vbus, GND, CC1, and CC2 lines per port from the power block;

an input connector for high speed USB data lines;

an electronic circuit including a USB hub and circuitry for providing USB functionality; and a USB type C connector per port to interface with an end user device.

5. The Power Delivery assembly of claim 4, wherein the at least one first user interface module includes:

a printed circuit board assembly including one or more electronic circuits; and a mechanical enclosure configured to protect the one or more electronic circuits of the printed circuit board assembly.

6. The Power Delivery assembly of claim 5, wherein the user interface module comprises a second user interface module configured to be operable as a charger only with Power Delivery (PD) that includes:

an input connector for receiving the Vbus, GND, CC1, and CC2 lines per port from the power block;

an electronic circuit per port to terminate DP/DM lines from an end user device; and a USB type C connector per port to interface with an end user device.

7. The Power Delivery assembly of claim 1, wherein the power block includes:

one or more input connectors for receiving power, control, and/or communication lines from a vehicle;

an input filter to support vehicle transients and clean electromagnetic noise generated by the power block;

a switching mode DC-DC converter per port to generate a voltage required by USB Power Delivery (PD);

a USB Power Delivery (PD) controller per port to drive the switching mode DC-DC converter and communicate with an end user device via CC1 and CC2 lines;

electrostatic discharge (ESD) protection for signal and power lines (Vbus, GND, CC1 and CC2) per port; and an output connector to connect with the harness.

8. The Power Delivery assembly of claim 1, wherein the Power Delivery assembly comprises:

an antenna and circuit to communicate with the device under charge;

one or more input connectors for receiving power, control, and/or communication lines from a vehicle;

an input filter to support vehicle transients and clean electromagnetic noise generated by the wireless charger;

a first switching mode DC-DC converter to provide power to the one or more coils;

a second switching mode DC-DC converter per port to generate a voltage required by USB Power Delivery (PD);

a USB Power Delivery (PD) controller per port to drive the first and/or second switching mode DC-DC converter and communicate with an end user device via CC1 and CC2 lines;

electrostatic discharge (ESD) protection for signal and power lines (Vbus, GND, CC1 and CC2) per port; and an output connector to connect with the harness.

9. The Power Delivery assembly of claim 1, wherein the power block is embedded within an electronic control unit (ECU) of a vehicle that comprises the wireless charger.

10. The Power Delivery assembly of claim 1, further comprising a high-speed data cable configured to connect the user interface module with a host for a USB hub application.

11. A system comprising:

a plurality of power blocks each having a same or common form factor;

a plurality of first user interface modules each configured to be operable as a USB hub with Power Delivery (PD);

a plurality of second user interface modules each configured to be operable as a charger only with Power Delivery (PD); and a plurality of vehicle harnesses each having a same or common configuration for interconnecting a selected one of the power blocks with a selected one of the first and second user interface modules;

whereby each said power block is selectively interconnectable via any one of the vehicle harnesses with any one of the first and second user interface modules without having to make changes to vehicle configuration to accommodate for different power block modules and/or for different vehicle harnesses for different user interface types;

wherein the system comprises a plurality of wireless chargers each including a corresponding one of the power blocks and further comprising one or more coils to transfer power wirelessly to a device under charge.

12. The system of claim 11, further comprising one or more high-speed data cables configured to connect a corresponding one or more of the first user interface modules with a host for a USB hub application.

13. The system of claim 12, wherein each said first user interface module includes:

an input connector for receiving Vbus, GND, CC1, and CC2 lines per port from the power block;

an input connector for high speed USB data lines;
an electronic circuit including a USB hub and circuitry for providing USB functionality; and
a USB type C connector per port to interface with an end user device.

14. The system of claim 13, wherein each said second user interface module includes:
an input connector for receiving Vbus, GND, CC1, and CC2 lines per port from the power block;
an electronic circuit per port to terminate DP/DM lines from an end user device; and
a USB type C connector per port to interface with an end user device.

15. A system comprising:
a plurality of power blocks each having a same or common form factor;
a plurality of first user interface modules each configured to be operable as a USB hub with Power Delivery (PD);
a plurality of second user interface modules each configured to be operable as a charger only with Power Delivery (PD); and
a plurality of vehicle harnesses each having a same or common configuration for interconnecting a selected one of the power blocks with a selected one of the first and second user interface modules;
whereby each said power block is selectively interconnectable via any one of the vehicle harnesses with any one of the first and second user interface modules without having to make changes to vehicle configuration to accommodate for different power block modules and/or for different vehicle harnesses for different user interface types;
wherein each said power block includes:
one or more input connectors for receiving power, control, and/or communication lines from a vehicle;
an input filter to support vehicle transients and clean electromagnetic noise generated by the power block;
a switching mode DC-DC converter per port to generate a voltage required by USB Power Delivery (PD);
a USB Power Delivery (PD) controller per port to drive the switching mode DC-DC converter and communicate with an end user device via CC1 and CC2 lines;
electrostatic discharge (ESD) protection for signal and power lines (Vbus, GND, CC1 and CC2) per port; and
an output connector to connect with the harness.

16. The system of claim 11, wherein the plurality of wireless chargers comprises:
an antenna and circuit to communicate with the device under charge;
one or more input connectors for receiving power, control, and/or communication lines from a vehicle;
an input filter to support vehicle transients and clean electromagnetic noise generated by the wireless charger;
a first switching mode DC-DC converter to provide power to the one or more coils;
a second switching mode DC-DC converter per port to generate a voltage required by USB Power Delivery (PD);
a USB Power Delivery (PD) controller per port to drive the first and/or second switching mode DC-DC converter and communicate with an end user device via CC1 and CC2 lines;
electrostatic discharge (ESD) protection for signal and power lines (Vbus, GND, CC1 and CC2) per port; and
an output connector to connect with the harness.

17. The system of claim 16, wherein the plurality of power blocks are embedded within electronic control units (ECU) of vehicles and/or comprise standalone power modules.

18. A method comprising:
selecting a power block from a plurality of power blocks each having a same or common form factor;
selecting a user interface module from a plurality of first user interface modules each configured to be operable as a USB hub with Power Delivery (PD) and a plurality of first user interface modules each configured to be operable as a charger only with Power Delivery (PD); and
selecting a vehicle harness from a plurality of vehicle harnesses each having a same or common configuration; and
interconnecting the selected power block with the selected user interface module via the selected vehicle harness;
whereby each said power block is selectively interconnectable via any one of the vehicle harnesses with any one of the first and second user interface modules without having to make changes to vehicle configuration to accommodate for different power block modules and/or for different vehicle harnesses for different user interface types;
wherein at least one of the plurality of power blocks is included with a wireless charger comprising one or more coils to transfer power wirelessly to a device under charge.

19. The method of claim 18, wherein each said first user interface module includes:
an input connector for receiving Vbus, GND, CC1, and CC2 lines per port from the power block;
an input connector for high speed USB data lines;
an electronic circuit including a USB hub and circuitry for providing USB functionality; and
a USB type C connector per port to interface with an end user device.

20. The method of claim 19, wherein each said second user interface module includes:
an input connector for receiving Vbus, GND, CC1, and CC2 lines per port from the power block;
an electronic circuit per port to terminate DP/DM lines from an end user device; and
a USB type C connector per port to interface with an end user device.

* * * * *